H. KLEINSCHMIDT.
ELECTRICAL POWER TRANSMISSION.
APPLICATION FILED SEPT. 11, 1909.
1,001,047.
Patented Aug. 22, 1911.
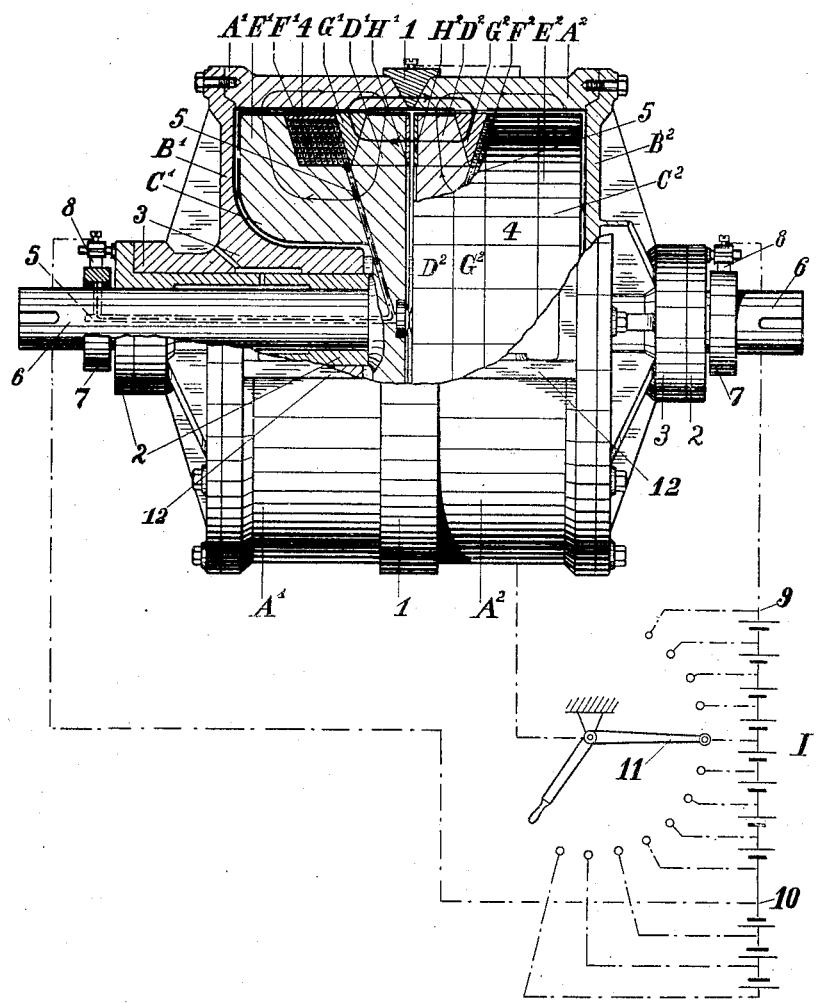

UNITED STATES PATENT OFFICE.

HANS KLEINSCHMIDT, OF BERLIN-WILMERSDORF, GERMANY.

ELECTRICAL POWER TRANSMISSION.

1,001,047.      Specification of Letters Patent.     Patented Aug. 22, 1911.

Application filed September 11, 1909. Serial No. 517,228.

*To all whom it may concern:*

Be it known that I, HANS KLEINSCHMIDT, a subject of the Emperor of Germany, residing at Berlin-Wilmersdorf, in the Kingdom of Prussia, Germany, have invented certain new and useful Improvements in Electrical Power Transmission, of which the following is a specification.

This invention relates to dynamo-electrical power transmission and is particularly applicable to the transmission devices of power supplied by a motor having a constant speed and torque to a load operating at varying speed and torque, as for instance to the power transmission in motor vehicles driven by a petrol or benzol engine or the like. It has already been proposed to employ for these purposes an electrically operating power transmission device comprising a generator driven by the engine and transforming the mechanical energy into electrical energy, and a motor receiving this electrical energy and transforming it again into mechanical work.

The object of this invention is to provide a power transmission device of this kind, which is much simpler and cheaper in construction, of comparatively very small weight and proportions and of a high efficiency. These advantages are obtained by employing two separate machines of the unipolar type for the transformation of energy, in such a manner as to connect the rotary parts of the generator or primary machine with those of the motor, or secondary machines only in an electrical way. The combination of the two machines is preferably effected by building them immediately together, so that the stators form a common casing in the interior of which the rotors revolve with their adjacent end faces opposite each other.

The great advantages obtainable by the application of the principle of unipolar induction in the building of electrical machines are known. It has not, however, been possible heretofore to derive any considerable advantages for practical purposes from the application of unipolar machines of primitive construction, since there is no need for the low voltage obtainable in such machines at an admissible speed. On the other hand there must be drawn unusually large currents from such machines to make the most of their capacity. These conditions, however, are by no means unsuitable for the purposes of electrical power transmission at a very small distance. The losses of potential may almost be avoided by building both machines close together, the low voltage then is scarcely to be regarded still as a drawback. The capacity of the machines may be completely utilized, since great current intensities are just what is desired owing to the short longitudinal extension of the active armature conductors. Owing to the opportunity afforded by the close connection of the machines, to distribute the working currents in an absolutely continuous and uniform manner all around the peripheries, injurious reactions of the working currents on the magnetic fields with their consequences of losses due to eddy currents and hysteresis are avoided. As the field structures need not be interrupted by special conductors for the working currents, the latter being conducted by the active material of those structures itself, the magnetic fluxes will be absolutely uniform, so that also from this side the formation of eddy currents is not to be feared. For the same reason the system of magnetic lines of force may have the most favorable form, that is to say, that of a continuous hollow ring. The reduction of the air gaps being not limited owing to the default of a detrimental armature reaction, the magnetizing currents may be very small. The armatures need not be laminated, but may be formed as solid iron blocks. The losses due to the friction of the current collectors are reduced to the amount corresponding to the relative speed of the rotors.

The invention will best be understood by reference to the drawings, which shows in side elevation with parts in section a power transmission device constructed according to my invention.

$A^1$ represents the stator or field structure of the primary or generator side, $A^2$ that of the secondary or motor side of the device. Each of the stators consists of an iron or steel band, which are connected with each other by the means of a copper ring 1 of cuneiform or similar cross section, so as to form a common hollow cylindrical body. The connection must be a good conductor and is preferably secured by casting, welding, galvanizing or soldering. To the outer end faces of the common stator body two covers $B^1$ and $B^2$ are bolted, these covers serving to form a closed casing together with the stator body and to support the bearings, 2, 2 for the two rotors or armatures $C^1$ and $C^2$, the bearings being arranged within central bushings 3, 3 of the covers projecting inwardly into corresponding central bores of the rotor bodies.

The rotors represent massive cylindrical blocks of iron or steel each provided with two radially projecting flanges $E^1$, $E^2$ and $D^1$, $D^2$ forming between them an annular groove of trapeziform cross section. The inner flanges $D^1$, $D^2$ are preferably formed of separate rings, which are shrunk upon the adjacent inner ends of the armature bodies. The annular recesses between the flanges serve to receive the energizing coils $F^1$, $F^2$ for producing the magnetic fluxes and also two copper rings $G^1$, $G^2$ and annular disks $H^1$, $H^2$ serving to transmit the working currents of the mechanism between the different parts of the machines, the last named disks also serving to separate the magnetic fluxes of both machines. The copper rings $G^1$, $G^2$ and the annular copper disks $H^1$, $H^2$ are connected to their proper iron rings $D^1$, $D^2$ respectively also by casting, galvanizing, welding or soldering in order to obtain a good electrical contact.

The one ends of the energizing coils, which are covered with annular strips 4, 4, are led through bores 5, 5 in the rotor bodies and in the shafts 6, 6 supporting the same, to collector rings 7, 7 secured to, but insulated from said shafts outside of the stator casing. Brushes 8, 8 slide on these rings and are electrically connected to the terminals 9 and 10 of a battery I. A contact arm 11 adapted to be moved over the contact plugs of the elements of this battery is electrically connected with the copper ring 1.

The whole mechanism may be suspended from the frame of a vehicle or the like by means of brackets 12, 12, secured to the casing.

The air gaps between the rotors and the casing and between the inner end faces of the rotors are formed as small as possible. The free end faces of the annular disks $H^1$, $H^2$, the cylindrical outer faces of the copper rings $G^1$, $G^2$ and the annular parts of the inner faces of the casing opposite said cylindrical faces are coated with platinum, or are amalgamated, either directly or after having been first coated with platinum, or another suitable metal. All the other faces are electrically insulated by being varnished, oxidized or enameled. The spaces between the two rotors and between the rotors and the stators may be wholly or partially filled with mercury.

The operation of the mechanism is as follows: The magnetizing coils $F^1$, $F^2$ being energized, magnetic fluxes will be produced within the iron bodies of the stators and rotors, the lines of force taking the directions indicated by the light arrow lines encircling the coils. When the rotor of the left hand machine, which is supposed to be the generator, is rotated, the electromotive force induced by the magnetic flux of this machine will cause a current through the adjacent parts of both machines along the path indicated by the heavy arrow line, the mercury being distributed by the centrifugal force equally all around the amalgamated annular faces and thus forming an intermediary uniformly distributed conductor between the parts of the machines moving relatively to each other. In reality the current, of course, will spread more than indicated by the arrow and will represent a hollow annular body extending continuously all around the peripheries of the stators and rotors. Owing to the absolutely uniform distribution of this current along the magnetic fields a detrimental reaction upon the latter and in consequence the formation of eddy currents is impossible, all the more as also the magnetic fields are absolutely homogeneous. The current will produce in the right hand rotor together with the magnetic flux of this side a torque which will cause this rotor to revolve. The speed of rotation will increase as long as the electromotive force induced in this machine will counterbalance that of the primary machine, deducting the losses of voltage due to the electrical resistances of the course of current. By altering the intensity of the magnetization either of one or both machines by means of the controlling arm 11 the degree of the torques and of the speeds of the two machines may be altered as desired. In particular it is possible to maintain a constant speed or torque on the primary side at different speeds or torques on the secondary side, and also to reverse the direction of rotation of this side at will.

The mercury need not completely fill the spaces within the casing as it will be thrown by the centrifugal force outwardly to the current transmitting faces. Instead of mercury, other liquids, or solid bodies may be used as current transmitting means, provided that they can be uniformly distributed around the peripheries. The energizing coils may also be located within the stators.

I have illustrated and described only one specific construction of the unipolar machines and of the manner how to combine them, and it is obvious that the construction, arrangement and combination may be varied as desired. Accordingly I do not intend to limit myself to the particular constructions, arrangements and combinations of the parts here shown.

What I claim is:

1. The combination of a plurality of machines of the unipolar type, each of the machines having a stator and a rotor, the rotors being movable independently of each other, means for producing a separate magnetic flux within each of said machines and means for electrically connecting the rotors of said machines for the transmission of power.

2. The combination of a plurality of unipolar machines, each machine comprising a field structure and an armature rotatable relatively to said field structure, said armatures being freely movable relatively to each other, means for producing separate magnetic fluxes within the field structures of the said machines and means for electrically connecting the rotary parts of said machines for the transmission of power.

3. The combination of a plurality of unipolar machines, each machine having a separate stator and a separate rotor the rotors being movable independently of each other, the stators being fixed relatively to each other, means for producing separate magnetic fluxes within said machines, and means for electrically connecting the rotors of the machines for the transmission of power.

4. The combination of a plurality of unipolar machines, each machine having a separate stator and a separate rotor, the rotors being movable independently of each other, the stators being built close together, means for producing separate magnetic fluxes within said machines and means for electrically connecting the said rotors for the transmission of power.

5. In a dynamo-electrical power transmission device the combination of a plurality of unipolar machines, means for electrically connecting said machines and means for distributing the working currents of the connected machines uniformly along their magnetic fluxes.

6. The combination of a plurality of machines of the unipolar type, each machine comprising a field structure and an armature rotatable relatively to said field-structure, said armatures being freely movable relatively to each other and themselves forming the conductors for the working-currents, means for producing a separate magnetic flux within each machine and means for electrically connecting the rotary part of said machines for the transmission of power.

7. In a dynamo-electrical power transmission device the combination of a plurality of unipolar machines electrically connected with each other, each of said machines having a rotor and a stator and means for equally distributing the working currents of said machines all around the peripheries of said rotors.

8. In a dynamo-electrical power transmission device the combination of a plurality of unipolar machines, adapted to work as a motor and a generator respectively, said machines being electrically connected with each other and each of them comprising a rotor and a stator, the magnetic material of said rotors and stators being continuous along their peripheries and means for equally distributing the working currents of said machines along the peripheries.

9. In a dynamo-electrical power transmission device the combination of a plurality of unipolar machines, each having a rotor and a stator the bodies of which in their whole peripheral extent forming the conductors for the working currents of said machines and means for uniformly distributing said currents along the circumferences of said rotors and stators.

10. In a dynamo-electrical power transmission device the combination of a generator and a motor both of the unipolar type and each of them having a rotor and a stator, the bodies of which in their whole peripheral extent forming the conductors for the working currents of said generator and said motor, said stators being so connected as to form annular electrical contact faces, means for leading the working currents from said rotors to said stators and means for electrically connecting said rotors.

11. The combination of a generator and a motor, both of the unipolar type and each having a rotor and a stator, the bodies of which form the conductors for the working-current of said generator and said motor, the stators being immediately connected with each other in an electrical way, means for transmitting the working-currents between said rotors and stators and means for electrically connecting said rotors for the transmission of power.

12. In a dynamo-electrical power transmission device the combination of a plurality of unipolar machines, each having a rotor and a stator the bodies of which in their whole peripheral extent forming the conductors for the working currents, said stators being electrically connected by means of a ring of electrically conducting but nonmagnetic material, means for conducting the working currents in uniform distribution along the peripheries from one of said rotors to one of said stators and from the other stator to the other rotor and means for electrically connecting said rotors.

13. In a dynamo-electrical power transmission device the combination of a plural ity of unipolar machines each having a rotor and a stator the bodies of which forming the conductors for the working currents, said stators being connected with each other so as to form annular electrical contact faces between them, a current connector between said rotors and said stators equally distributed all around their peripheries and means for electrically connecting said rotors.

14. In a dynamo-electrical power transmission device the combination of a generator and a motor both of the unipolar type and each having a rotor and a stator the bodies of which forming the conductors for the working currents, said stators being electrically connected by means of a ring of electrically conducting but non-magnetic material, a current connector between said rotors and said stators uniformly distributed along their peripheries and means for electrically connecting said rotors.

15. In a dynamo-electrical power transmission device the combination of a plurality of unipolar machines each having a rotor and a stator, the bodies of which forming the conductors for the working currents, said stators being connected so as to form annular electrical contact faces between them, a liquid conductor adapted to spread between said rotors and said stators and means for electrically connecting said rotors.

16. In a dynamo-electrical power transmission device the combination of a generator and a motor both of the unipolar type and each having a rotor and a stator, the bodies of which forming the conductors for the working currents, said stators being connected so as to form annular electrical contact faces between them, means for leading the working currents in uniform distribution along the peripheries from said rotors to said stators and vice versa and a circularly arranged connector between said rotors connecting them electrically.

17. In a dynamo-electrical power transmission device the combination of a generator and a motor both of the unipolar type and each of them having a rotor and a stator, the bodies of which forming the conductors for the working currents, said stators being connected with each other so as to form annular electrical contact faces between them, means for electrically connecting said rotors to said stators uniformly all around their circumferences and a liquid conductor between said rotors touching the end faces of them in annular faces and forming an electrical connection between them.

18. In a dynamo-electrical power transmission device the combination of a plurality of unipolar machines having their field structures built close together, the armatures being freely rotatable relatively to each other and electrically connected and means for separating the magnetic fluxes of said field structures from each other.

19. The combination of a plurality of unipolar machines, each machine having a rotor and a stator, the stators being fixed one relatively to the other, the rotors being movable independently of each other, and means for electrically connecting the said rotors for the transmission of power.

20. In a dynamo-electrical power transmission device the combination of a plurality of unipolar machines, each having a stator and a rotor, the stators being fixed relatively to each other, the rotors being movable independently of each other, means for electrically connecting both machines so as to lead the working currents in paths equally distributed along the magnetic fluxes of said machines.

21. In a dynamo-electrical power transmitting mechanism the combination of a plurality of unipolar machines, comprising adjacent annular stators forming a common casing, rotors adapted to rotate within said casing adjacent to each other, the adjacent end faces of said stators being connected so as to form annular electrical contact faces, means for producing different magnetic fluxes in said machines, the bodies of said rotors and stators being adapted to serve in their whole peripheral extent as conductors for the currents induced by the relative motion between said stators and said rotors, means for equally connecting said rotors and stators in annular faces and means for electrically connecting the opposite end faces of said rotors.

22. In a dynamo-electrical power transmitting device the combination of a plurality of unipolar machines, comprising adjacent annular field structures and armatures adapted to rotate within said structures, the former being connected to each other by means of a ring of electrically conducting but non-magnetic material, two covers attached to the outer ends of said annular structures thus forming a closed casing inclosing said armatures, bearings in said covers supporting the respective armatures, separate magnetizing coils for producing two different fluxes within said field structures and said armatures, means for electrically connecting said armatures to said field structures in annular faces adjacent said magnetizing coils and means for electrically connecting the adjacent end faces of said armatures.

23. In a dynamo-electrical power transmitting device the combination of a plurality of unipolar machines, comprising adjacent annular stators, rotors adapted to rotate independently within said stators adjacent to each other, the adjacent faces of said stators being connected so as to form annular electrical contact faces, separate magnetizing coils for producing different fluxes in said stators and rotors, covers attached to the opposite outer end faces of said stators thus forming a closed casing containing said rotors, bearings in said covers supporting said rotors, a liquid conductor within said casing and means for spreading said liquid conductor so as to form annular electrical connectors between said stators and said rotors and between the rotors.

24. In a dynamo-electrical power transmitting mechanism the combination of a plurality of unipolar machines, comprising an annular casing consisting of iron rings connected at their end faces by interposing a ring of electrically conducting but non-magnetic material and uniting the contact faces in a metallic way, cylindrical iron blocks fitting with small play within said casing and adapted to rotate therein, each of said blocks having a shaft projecting outwardly from it, two magnetizing coils adapted to produce magnetic fluxes within said blocks and said iron rings, covers attached to the opposite outer ends of said iron rings thus closing the ends of said casing, bearings in said covers supporting said shafts, means for exciting said coils, means for electrically connecting said blocks to their proper rings in annular faces adjacent said magnetizing coils and means for electrically connecting the adjacent ends of said blocks in annular faces.

25. In a dynamo-electrical power transmitting device the combination of a plurality of unipolar machines, comprising an annular casing consisting of iron rings connected at their end faces by interposing a copper ring of cuneiform section and uniting the contact faces in a metallic way, cylindrical iron blocks fitting with small play within said casing and being adapted to rotate therein, each of said blocks having a shaft projecting outwardly, covers attached to the outer ends of said iron rings thus closing the ends of said casing, bearings in said covers supporting said shafts, magnetizing coils embedded in said blocks, means for energizing said coils, a layer of insulating material on the outer faces of said blocks and on the inner faces of said iron rings, said layers being interrupted in opposite annular faces of said iron rings and blocks adjacent to said magnetizing coils and in opposite annular faces of the inner ends of said blocks and a liquid conductor within the spaces between said blocks and said iron rings and between each of said blocks, said liquid conductor mediating the transition of the current only in said annular faces.

26. In a dynamo-electrical power transmitting mechanism the combination of a plurality of unipolar machines comprising, an annular casing consisting of two continuous iron rings connected at their end faces by interposing a copper ring of wedge-like section and uniting it to said iron rings in a metallic way, cylindrical iron blocks fitting with small play within said casing and being adapted to rotate therein, each of said blocks having a shaft projecting outwardly and two radially projecting flanges forming an annular recess of trapezoid cross section between them, central bores in said blocks surrounding said shafts, covers attached to the outer ends of said casing thus closing it tightly, central bushings in said covers projecting inwardly into said bores, bearings in said bushings supporting said shafts, a magnetizing coil in each of said recesses, a cuneiform copper ring between each of said coils and the inner side walls of each of the inner flanges and an annular copper disk on the outer side walls of each of the inner flanges, said cuneiform copper rings and said annular disks being soldered, cast or galvanized to said inner flanges, the free outer faces of said cuneiform copper rings, the opposite cylindrical faces of said iron rings and the free end faces of said annular disks being amalgamated, the other faces of said casing and said blocks being insulated, mercury within said casing and means for energizing said coils.

27. In a dynamo-electrical power transmission device the combination of a plurality of unipolar machines, each of said machines having a rotor and a stator, means for electrically connecting said machines and means for equally distributing the working currents all around the circumference of said rotors.

28. The combination of a plurality of unipolar machines, each machine having a rotor and a stator, the magnetic material of the rotors and stators being substantially continuous along their peripheries and forming a closed iron path for the magnetic fluxes interrupted only by the air-gaps between said rotors and stators, and means for electrically connecting the said rotors for the transmission of power.

29. The combination of a plurality of unipolar machines, each machine having a rotor and a stator, the magnetic material of said stators forming the conductors for the outer working-current of said machines, and means for electrically connecting the rotors of said machines for the transmission of power.

30. In a dynamo-electrical power transmission device the combination of a plurality of unipolar machines each having a separate rotor and a separate stator, the bodies of said rotors themselves forming the conductors for the currents induced in said machines, said rotors being electrically connected in such a manner, as to distribute their working currents uniformly along the magnetic fluxes of said machines.

31. In a dynamo-electrical power transmission device the combination of a plurality of unipolar machines electrically connected with each other, the armature bodies of said machines serving as conductors for the working currents and means for leading said currents in paths substantially uniformly distributed along the magnetic fluxes of said machines.

In testimony whereof I affix my signature in presence of two witnesses.

HANS KLEINSCHMIDT.

Witnesses:
AUGUST TRAUTMANN,
HENRY HASPER.

Copies of this patent may be obtained for five cents each, by addressing the "Commissioner of Patents, Washington. D. C."